United States Patent [19]

Noble

[11] Patent Number: 4,936,731

[45] Date of Patent: Jun. 26, 1990

[54] CARGO TRAILER ALIGNING MEANS

[75] Inventor: William L. Noble, Village of Wolverine Lake, Mich.

[73] Assignee: Chrysler Corporation, Highland Park, Mich.

[21] Appl. No.: 365,060

[22] Filed: Jun. 12, 1989

[51] Int. Cl.⁵ .............................................. B65G 69/22
[52] U.S. Cl. .................................... 414/401; 414/584
[58] Field of Search ............ 414/373, 396, 401, 584; 14/71.1

[56] References Cited

U.S. PATENT DOCUMENTS

| | | | |
|---|---|---|---|
| 2,227,283 | 12/1940 | Soref | 414/373 |
| 2,711,835 | 6/1955 | Kappen | |
| 2,828,027 | 3/1958 | Stevenson et al. | 414/401 X |
| 3,250,408 | 5/1966 | Daniluk et al. | 414/396 |
| 4,560,315 | 12/1985 | Hahn | 414/401 |
| 4,655,667 | 4/1987 | Plumb et al. | 414/401 X |
| 4,695,216 | 9/1987 | Erlandsson | 414/401 |

FOREIGN PATENT DOCUMENTS

| | | | |
|---|---|---|---|
| 2353232 | 5/1974 | Fed. Rep. of Germany | 414/396 |
| 1364448 | 8/1974 | United Kingdom | 414/401 |

Primary Examiner—Frank E. Werner
Assistant Examiner—Robert S. Katz
Attorney, Agent, or Firm—Edward A. Craig

[57] ABSTRACT

Cargo trailer aligning apparatus is provided for aligning a loading track on the floor of a cargo trailer with a loading track on the floor of a loading dock. The tracks are aligned both vertically and horizontally. The aligning apparatus includes a pair of spaced apart aligning ramps which are positioned beneath the loading dock surface for interaction with a pair of spaced apart aligning legs which extend downwardly from the rear of the cargo trailer. The interaction occurs as the cargo trailer is backed up to the loading dock.

4 Claims, 2 Drawing Sheets

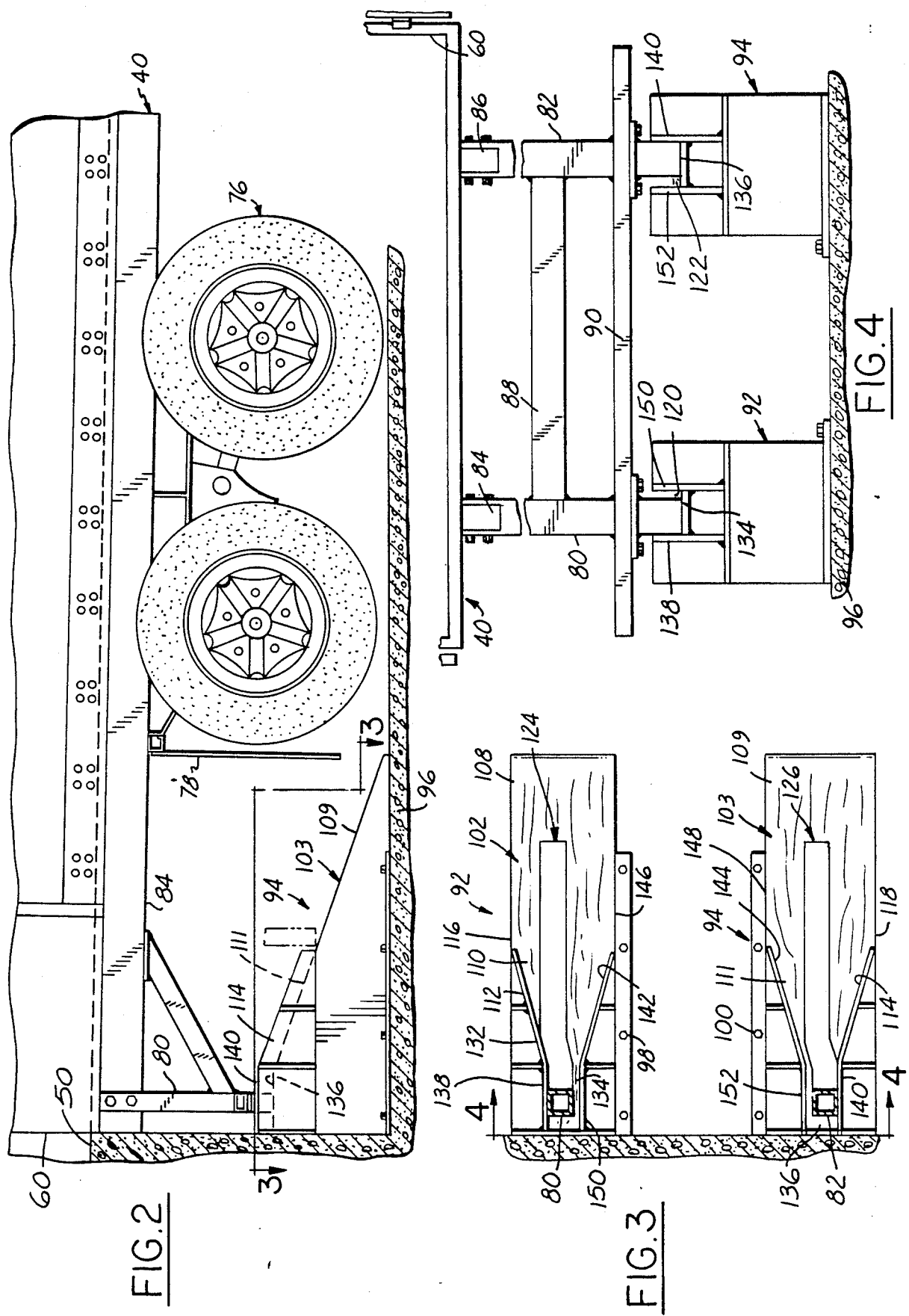

CARGO TRAILER ALIGNING MEANS

BACKGROUND OF THE INVENTION

1. Field of the Invention

The cargo trailer aligning means includes a pair of aligning ramps positioned beneath a loading dock to guide a cargo trailer to a proper position with respect to the loading dock.

2. Description of Related Art

Modern material handling systems increasingly utilize automated loading and unloading equipment. This is particularly true in connection with automotive assembly operations. Increasingly, automotive assembly operations are utilizing what is referred to as "just-in-time" inventory control. As the term implies, this system has as an objective to delivery components to an automotive assembly plant as they are needed for assembly of vehicles. In the past, assembly plants have included large storage areas for storing large inventories of vehicle components which had been fabricated and shipped from remote manufacturing facilities. Not only does such an inventory system require that the assembly plant be provided with the storage area (which involves expensive initial construction, maintenance and utilities), such a system also requires the maintenance of a large parts and components inventory which is undesirable from a finance point of view.

However, "just-in-time" delivery of parts and components requires highly efficient assembly plant material handling techniques in order that cargo can be quickly and effectively removed from trucks and delivered to the point of use and also that empty shipping racks be removed from assembly areas and loaded onto cargo trailers in an efficient manner in view of the fact that storage space is severely limited under such a system.

One material handling system which has been in the process of implementation to achieve the desired ends above referred to involves the use of robotic lift trucks capable of loading and unloading cargo trailers without human intervention. One useful technique involves a guidance system which operates with a combination of dead reckoning and laser guidance. This system does away with dependence on a fixed path (such as a buried wire) for robotic lift trucks. On-board computers are provided on the trucks. The trucks include sensors which work by triangulation from identifiable landmarks which are fixed in known positions within the area of operation. The landmarks are created by installing bar coded targets at convenient intervals throughout the operating area. Positions of these targets are accurately surveyed and the coordinates recorded in the system software. From information on the angle of the targets scanned, the on-board computer calculates the exact position of the vehicle by a process of triangulation.

The vehicle follows an assigned loading track. A similar loading track is assigned to the floor of a cargo trailer for integration into the main system. In order for such a system to work effectively, it is necessary that the cargo trailer be accurately aligned at the loading dock so that the loading track of the cargo trailer is in alignment with the loading track on the floor of the loading dock. In the past, cargo trailer aligning techniques have been proposed.

For example, U.S. Pat. No. 2,711,835, issued June 28, 1955, discloses a structure for aligning a cargo trailer with a chute built upon a warehouse platform. However, the system proposed includes the use of relatively complicated structure. In accordance with the present invention, simplified structure is provided to accomplish the desired purpose.

SUMMARY OF THE INVENTION

Cargo trailer aligning means is provided. The aligning means includes a pair of aligning ramps positioned in spaced apart relationship beneath a loading dock surface upon which is assigned a loading track. The cargo trailer includes a rear loading opening from which extends forwardly of the cargo trailer a cargo support surface upon which is assigned a loading track. Ground engaging wheel structure is provided on the underside of the cargo trailer adjacent the rear loading opening.

A pair of spaced apart aligning legs extend downwardly from the underside of the cargo trailer and are positioned rearwardly of the ground engaging wheels closely adjacent to the rear loading opening. The spacing cf the aligning ramps and aligning legs is correlated so that each aligning leg will contact one of the aligning ramps when the cargo trailer is backed up with the loading track thereof in general horizontal alignment with the loading dock track.

Each aligning ramp includes an upwardly inclined ramp surface. The ramp surfaces are substantially wider than the aligning legs to permit reception of the lower ends of the aligning legs thereon even though the loading track of the cargo trailer is not in exact horizontal alignment with the dock loading track. Each ramp surface includes a first unobstructed lowermost portion permitting free sliding movement of the aligning legs therealong upon backing up of the cargo trailer. The length of the legs and the first ramp surface portion is sufficient to cause the rearward end of the cargo trailer to rise a distance sufficient to cause the wheel structure to lose ground engaging contact when the aligning legs have been slid to the upper end of the first ramp surface portion.

Each ramp surface includes a second uppermost portion. A guide wall is provided on each second ramp portion. Each guide wall extends from a point along the longitudinal edge of the second ramp surface portion adjacent the upper end of the first ramp surface portion and is angled laterally inwardly of the second ramp surface portion.

Each guide wall is positioned with respect to one of the aligning legs so as to make contact with the aligning leg at some point of sliding movement of the leg up the second ramp surface portion if the rear loading opening of the cargo trailer loading track is out of horizontal alignment with the loading dock track in the direction of the guide wall when the cargo trailer is backed up towards the loading dock. The guide wall will cause the rearward end of the cargo trailer to pivot towards a position where the two tracks are in exact horizontal alignment. The length of the guide walls is sufficient to result in exact horizontal and vertical alignment of the two tracks when the aligning legs have slide up the second ramp surface portion. The spacing of the aligning legs is such that only one of the aligning legs will contact its guide wall during the alignment process depending upon which direction the horizontal misalignment of the two tracks occurs.

Each ramp has a horizontal ramp surface extending towards the loading dock from the upper end of its inclined ramp surface. The horizontal ramp surfaces receive the aligning legs at the termination of backing the cargo trailer up to the loading dock and positioning of the two tracks in exact vertical and horizontal alignment. Each horizontal ramp surface has a retaining wall positioned to contact the lower end of the aligning legs received on its respective horizontal ramp surface. Each retaining wall contacts one of the outer or inner surface portions of the aligning legs to prevent lateral movement of the aligning legs after they have been received on the horizontal ramp surfaces. Preferably, a layer of grease is provided on the ramp surfaces to facilitate sliding of the aligning legs thereon.

IN THE DRAWINGS

FIG. 2 is a side elevational view of the rearward portion of one of the cargo trailers of FIG. 1 illustrating the cargo trailer aligning means of the present invention;

FIG. 3 is a sectional view taken substantially along the line 3—3 of FIG. 2 looking in the direction of the arrows; and FIG. 4 is a sectional view taken substantially along the line 4—4 of FIG. 3 looking the direction cf the arrows.

DETAILED DESCRIPTION OF A PREFERRED EMBODIMENT

Figure 1:
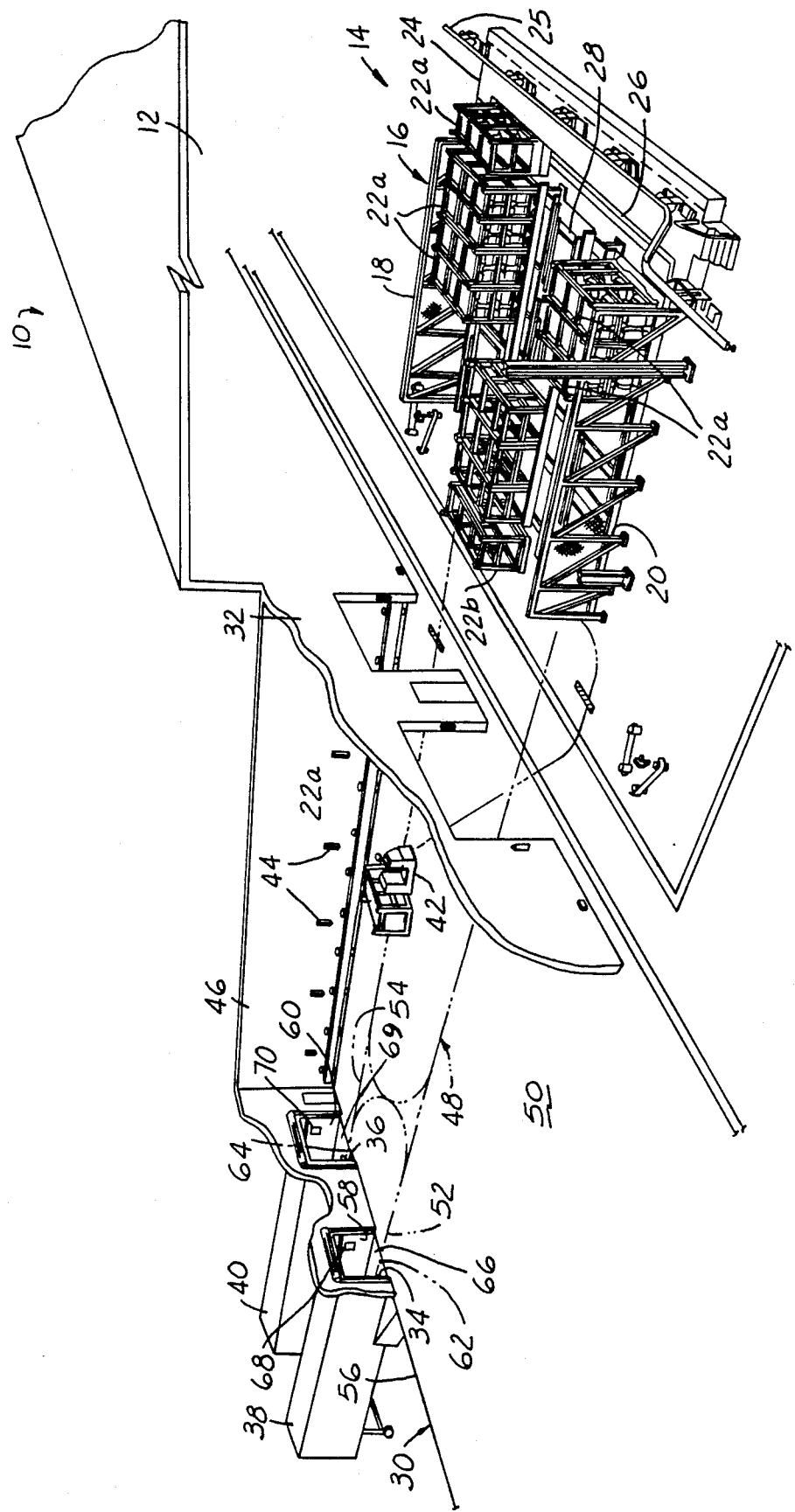
FIG. 1 is a view in perspective of a portion of a vehicle assembly plant including a loading dock with two cargo trailers in position with respect thereto wherein the cargo trailer aligning means of the present invention is employed.

The environment in which the cargo trailer aligning means of the present invention is used is illustrated in FIG. 1. As will therein be noted, a vehicle assembly plant 10 has an interior space 12 within which is located an assembly work station 14. The work station 14 includes a rack storage structure 16. The structure 16 includes a pair of spaced apart rack receiving structures 18, 20 which function to receive loaded racks 22a and convey these racks towards a platform 24 as needed. Assembly operators are stationed on the platform 24 for unloading vehicle components from a loaded rack 22a positioned by the structure for such unloading. The racks illustrated are, for example, adapted to carry vehicle seats. The assembly operators remove seats from the rack and place them on a seat delivery conveyor 25 which takes them to a point of use for mounting in a vehicle. A rack transfer structure 26 is provided for receiving racks and moving the racks after they have been unloaded. A central rack receiving structure 28 is provided between the structures 18, 20 for receiving empty racks 22b which are conveyed rearwardly of the structure 28.

Racks are loaded and unloaded from the work station racks storage structure 16 from a loading dock 30 which is separated from the space 12 by a wall 32. The loading dock 30 illustratively has two bays 34, 36 from which racks can be loaded or unloaded from cargo trailers 38, 40 which are backed up to the bays. The means for transporting loaded and unloaded racks comprises a lift truck 42. The lift truck 42 is controlled by means of a computer programmed dead reckoning system and by means of a series of bar-coded targets 44 mounted on the wall 46 of the loading dock. The lift truck 42 includes on-board computer means and sensor means for relating to the targets 44 which result in the guidance system. The guidance system defines an assigned loading track complex 48 on the floor surface 50 of the loading dock and assembly area. Elements 52, 54 of the loading track complex extend to the outer edge 56 cf the loading dock. The elements 52, 54 are so positioned as to cause the lift truck 42 to enter the rear loading openings 58, 60 of the cargo trailers 38, 40. The lift truck can unload loaded racks 22a and load unloaded racks 22b into the cargo trailers. The cargo trailers are also provided with assigned loading tracks 62, 64 on the cargo support surfaces 66, 69 which extend forwardly of the cargo trailers from the rear thereof. Bar-code targets 68, 70 are provided on the upstanding sidewalls of the cargo trailers to define the loading tracks. These targets work in the manner of the targets 44.

In order for this system to function properly, it is necessary to align the cargo trailers 38, 40 with the bays 34, 36 in such a manner to result in alignment of the loading dock tracks 52, 54 with the tracks 62, 64 of the cargo trailers. The racks are frequently almost as large as the distance between the sidewalls of the trailers, thus not permitting very much deviation and requiring that the lift truck follow an exact path for proper loading and unloading.

The cargo trailer aligning means of the present invention has then provided to ensure proper alignment of the tracks 52, 54 with the tracks 62, 64. This structure is illustrated in FIGS. 2-4. The cargo trailer 40 is illustrated. As will be noted, the cargo trailer 40 includes ground engaging wheel structure 76 in the form of a double axle. A mud flap 78 is provided rearwardly of the wheel structure. A pair of spaced apart aligning legs 80, 82 are bolted to trailer underbody structures 84, 86 and structurally supported by means of cross members 88, 90. The legs 80, 82 extend downwardly from the underside of the cargo trailer and are positioned rearwardly of the ground engaging wheel structure 76 closely adjacent to the rear loading opening 60.

A pair of aligning ramps 92, 94 are positioned in spaced apart relationship on the loading dock apron 96 beneath the loading dock surface 50. Bolt structures 98, 100 maintain the ramps in place. The spacing of the aligning ramps 92, 94 and aligning legs 80, 82 are correlated so that each aligning leg will contact one of the aligning ramps when the cargo trailer 40 is backed up with the loading track 64 thereof in general horizontal alignment with the loading dock track 54.

Each aligning ramp includes an upwardly inclined ramp surface 102, 103 which is substantially wider than the aligning legs to permit reception of the lower ends 104, 106 of the aligning legs thereon even though the loading track of the cargo trailer is not in exact horizontal alignment with the loading dock track.

Each ramp surface 102, 103 includes a first unobstructed lowermost portion 108, 109 which permits free sliding movement of the aligning legs therealong upon backing up of the cargo trailer 40. The length of the legs 80, 82 and the first ramp surface portions 108, 109 is sufficient to cause the rearward end of the cargo trailer 40 to rise a distance sufficient to cause the wheel structure 76 to lose ground engaging contact when the aligning legs have been slid to the upper end of the first ramp surface portions as indicated in dotted lines in FIG. 2.

Each ramp surface portion 102, 103 also includes a second uppermost ramp surface portion 110, 111. A guide wall 112, 114 is provided on each second ramp surface portion 110, 111. Each guide wall extends from a point along a longitudinal edge 116, 118 which is furthest from the other ramp and is angled longitudinally inwardly towards the other ramp. Each guide wall 112, 114 is positioned with respect to one of the aligning legs 80, 82 so as to make contact with the aligning leg at some point of sliding movement of the leg up the second ramp surface portion if the cargo trailer loading track is out of horizontal alignment with the loading dock track in the direction of the guide wall when the cargo trailer is backed up towards the loading dock.

FIG. 3 illustrates one path which the aligning legs may take while moving up the ramp surfaces 102, 103. The ramp surfaces are preferably covered with a layer of grease 120, 122 to facilitate sliding of the aligning legs 80, 82. As a consequence, the aligning legs will create observable paths 124, 126 as they slide up the ramp surfaces. As will be noted, the lower ends of the aligning legs 80, 82 contact the first ramp surface portions 108, 109 at points which are intermediate the ends of these surfaces. As the aligning legs 80, 82 slide up, they will cause the wheel structure 76 to rise off the ground as previously discussed. As illustrated in FIG. 3, the aligning legs 80, 82 are initially positioned out of horizontal alignment in the direction of the guide wall 112. Therefore, the aligning leg 80 will contact the guide wall 112 at point 132. The other aligning leg 82 will not contact its respective guide wall 114. As the cargo trailer is backed up, the aligning leg 80 will be guided by the guide wall 112 in a direction tending to cause the desired horizontal alignment of the cargo trailer loading track with the loading dock track. During this process, the cargo trailer will be pivoted. The wheel structure 76, being out of ground engaging contact, does not inhibit such pivoting. The length of the second ramp surface portions 110, 111 and guide walls 112, 114 is sufficient to result in the ramp and trailer loading tracks being in both vertical and horizontal alignment after the aligning legs 80, 82 have reached the upper ends of the second ramp surface portions and guide walls. Had the cargo trailer been out of alignment in the opposite direction, the aligning leg 82 would have contacted the guide wall 114, with the aligning leg 80 not contacting the guide wall 112 with the end result being the same as that illustrated. The spacing of the aligning legs is such that only one of the aligning legs will contact its guide wall during the alignment process depending upon which direction the horizontal misalignment of the two loading tracks occurs.

Each aligning ramp 92, 94 has a horizontal ramp surface 134, 136 extending from the upper end of the second ramp surface portions 110, 111. Each of these surfaces is provided with a retaining wall 138, 140. These retaining walls are positioned to contact the outer surface portions of the lower ends of the aligning legs after the aligning legs have passed up the inclined ramp surface and onto the horizontal ramp surfaces at the termination of backing up of the trailer. The retaining walls 138, 140 function to prevent lateral movement of the aligning legs after the aligning process has ended. Such misalignment might occur as a consequence of, for example, loading or unloading of the cargo trailer by means of a lift truck.

As will be noted in FIG. 3, an alternate set of guide walls 142, 144 are provided on the second ramp surface portions 110, 111. The guide walls 142, 144 extend from the opposite lateral edges 146, 148 of the second ramp surface portions 110, 111 and are angled away from the opposing ramp, which is the opposite of the angulation of the guide walls 112, 114. A second set of retaining walls 150, 152 is also provided This additional guide wall and retaining wall structure operates in the same manner as that previously described. However, it is designed to accommodate aligning legs which are spaced closer together than the aligning legs 80, 82. The retaining walls 150, 152 serve the same function of preventing lateral motion of the aligning legs after they have been slid onto the horizontal ramp surfaces 134, 136. However, retaining walls 150, 152 are adapted to contact the inner surface portions of the lower ends of the aligning legs.

I claim:

1. Cargo trailer aligning means comprising a pair of aligning ramps positioned in spaced apart relationship beneath a loading dock surface upon which is assigned a loading track, a cargo trailer including a rear loading opening from which extends forwardly of the cargo trailer a cargo support surface upon which is assigned a loading track, ground engaging wheel structure on the underside of the cargo trailer adjacent the rear loading opening, a pair of spaced apart aligning legs extending downwardly from the underside of the cargo trailer and positioned rearwardly of the ground engaging wheels closely adjacent to the rear loading opening, the spacing of the aligning ramps and aligning legs being correlated so that each aligning leg will contact one of the aligning ramps when the cargo trailer is backed up with the loading track thereof in general horizontal alignment with the loading dock track, each aligning ramp including an upwardly inclined ramp surface, the ramp surfaces being substantially wider than the aligning legs to permit reception of the lower ends of the aligning legs thereon even though the loading track of the cargo trailer is not in exact horizontal alignment with the dock loading track, each ramp surface including a first unobstructed lowermost portion permitting free sliding movement of the aligning legs therealong upon backing up of the cargo trailer, the length of the legs and the first ramp surface portion being sufficient to cause the rearward end of the cargo trailer to rise a distance sufficient to cause said wheel structure to lose ground engaging contact when the aligning legs have been slid to the upper end of the first ramp surface portion, each ramp surface including a second uppermost portion, a guide wall on each second ramp surface portion, each guide wall extending from a point along a longitudinal edge of the second surface ramp portion adjacent the upper end of the first ramp surface portion and being angled laterally inwardly of the second ramp surface portion, each guide wall being positioned with respect to one of the aligning legs so as to make contact with the aligning leg at some point of sliding movement of the leg up the second ramp surface portion if the rear loading opening of the cargo trailer loading track is out of horizontal alignment with the loading dock track in the direction of the guide wall when the cargo trailer is backed up towards the loading dock and cause the rearward end of the cargo trailer to pivot towards a position where the two tracks are in horizontal alignment, the length of the guide walls being sufficient to result in horizontal and vertical alignment of the two tracks when the aligning legs have slid up the second ramp surface portion, the spacing of the aligning legs being such that only one of the aligning legs will contact its guide wall during the alignment process depending upon which direction the horizontal misalignment of the two tracks occurs, each ramp having a horizontal ramp surface extending towards the loading dock from the upper end of its inclined ramp surface, the horizontal ramp surfaces receiving the aligning legs at the termination of backing the cargo trailer up to the loading dock and positioning the two tracks in vertical and horizontal alignment, each horizontal ramp surface having a retaining wall positioned to contact the lower end of the aligning leg received on its respective horizontal ramp surface, the retaining walls contacting one of the outer or inner surface portions of the aligning legs to prevent lateral movement of the aligning legs after they have been received on the horizontal ramp surfaces.

2. Cargo trailer aligning means as set forth in claim 1, further characterized in that each of the guide walls extends from the longitudinal edge of its ramp which is furthest from the other ramp and is angled towards the other ramp with the retaining walls adapted to contact the outer surface portions of the aligning legs.

3. Cargo trailer aligning means as set forth in claim 1, further characterized in that each of the guide walls extends from the longitudinal edge of its ramp which is nearest the other ramp and is angled away from the other ramp with the retaining walls adapted to contact the inner surface portions of the aligning legs.

4. Cargo trailer aligning means as set forth in claim 1, further characterized in the provision of a layer of grease on the ramp surfaces.

* * * * *